(12) United States Patent
Dontula et al.

(10) Patent No.: US 7,838,106 B2
(45) Date of Patent: Nov. 23, 2010

(54) FOAMED IMAGE RECEIVER

(75) Inventors: Narasimharao Dontula, Rochester, NY (US); Somsack Chang, Pittsford, NY (US); Richard D. Bomba, Rochester, NY (US); Terry A. Heath, Omaha, NE (US)

(73) Assignee: Eastman Kodak Company, Rochester, NY (US)

( * ) Notice: Subject to any disclaimer, the term of this patent is extended or adjusted under 35 U.S.C. 154(b) by 434 days.

(21) Appl. No.: 11/959,948

(22) Filed: Dec. 19, 2007

(65) Prior Publication Data

US 2009/0162580 A1 Jun. 25, 2009

(51) Int. Cl.
*B32B 3/26* (2006.01)

(52) U.S. Cl. .............. 428/304.4; 428/308.4; 428/313.5; 428/314.4; 428/480; 264/464; 264/45.3; 264/45.9; 399/38; 101/177

(58) Field of Classification Search .............. 428/304.4, 428/308.4, 313.5, 314.4, 480; 264/464, 45.3, 264/45.9; 399/38; 101/177
See application file for complete search history.

(56) References Cited

U.S. PATENT DOCUMENTS

| | | | |
|---|---|---|---|
| 5,084,334 A | 1/1992 | Hamano et al. | |
| 5,405,887 A | 4/1995 | Morita et al. | |
| 5,443,780 A | 8/1995 | Matsumoto et al. | |
| 6,379,780 B1 | 4/2002 | Laney et al. | |
| 6,409,334 B1 | 6/2002 | Campbell et al. | |
| 6,447,976 B1 | 9/2002 | Dontual et al. | |
| 6,489,008 B1 | 12/2002 | Campbell et al. | |
| 6,514,659 B1 | 2/2003 | Dontula et al. | |
| 6,537,656 B1 | 3/2003 | Dontula et al. | |
| 6,566,033 B1 | 5/2003 | Majumdar et al. | |
| 6,703,193 B1 | 3/2004 | Laney et al. | |
| 6,767,952 B2 | 7/2004 | Dontula et al. | |
| 6,787,217 B2 | 9/2004 | Squier et al. | |
| 6,844,047 B2 | 1/2005 | Kaminsky et al. | |
| 6,863,939 B2 | 3/2005 | Laney et al. | |
| 6,867,168 B2 | 3/2005 | Laney et al. | |
| 6,869,650 B2 | 3/2005 | Burch et al. | |
| 6,888,663 B2 | 5/2005 | Bourdelais et al. | |
| 6,958,365 B2 | 10/2005 | Dontula et al. | |
| 6,958,707 B1 | 10/2005 | Siegel | |
| 6,958,860 B2 * | 10/2005 | Dontula et al. .............. 359/599 |
| 7,008,760 B1 | 3/2006 | Yoneyama et al. | |
| 7,074,465 B2 | 7/2006 | Campbell et al. | |
| 7,078,367 B2 | 7/2006 | Laney et al. | |
| 7,078,368 B2 | 7/2006 | Laney et al. | |
| 7,094,733 B2 | 8/2006 | Laney et al. | |
| 7,143,674 B2 | 12/2006 | Lai et al. | |
| 7,179,523 B2 | 2/2007 | Lai et al. | |
| 7,198,363 B2 | 4/2007 | Wexler | |
| 2003/0152760 A1 | 8/2003 | Lai et al. | |
| 2003/0219663 A1 | 11/2003 | Sunderrajan et al. | |
| 2004/0119189 A1 | 6/2004 | Helber et al. | |
| 2004/0229966 A1 | 11/2004 | Dontula et al. | |
| 2004/0258857 A1 | 12/2004 | Dagan et al. | |
| 2005/0112302 A1 | 5/2005 | Laney et al. | |
| 2005/0112351 A1 | 5/2005 | Laney et al. | |
| 2005/0181196 A1 | 8/2005 | Aylward et al. | |
| 2005/0187104 A1 | 8/2005 | Laney et al. | |
| 2005/0187105 A1 | 8/2005 | Laney et al. | |
| 2005/0187106 A1 | 8/2005 | Laney et al. | |
| 2005/0191444 A1 | 9/2005 | Campbell et al. | |
| 2005/0191569 A1 | 9/2005 | Aylward et al. | |
| 2005/0233241 A1 | 10/2005 | Aylward et al. | |
| 2006/0115627 A1 * | 6/2006 | Dontula et al. ........... 428/195.1 |
| 2006/0204684 A1 | 9/2006 | Missell et al. | |
| 2006/0204685 A1 | 9/2006 | Missell et al. | |
| 2006/0204686 A1 | 9/2006 | Missell et al. | |
| 2007/0003713 A1 | 1/2007 | Wexler et al. | |
| 2007/0031615 A1 | 2/2007 | Nair et al. | |
| 2007/0054070 A1 * | 3/2007 | Laney et al. ............. 428/32.34 |
| 2007/0111133 A1 | 5/2007 | Foster et al. | |

FOREIGN PATENT DOCUMENTS

| | | |
|---|---|---|
| JP | 2001-138644 A | 5/2001 |
| JP | 2001-213058 A | 8/2001 |

* cited by examiner

*Primary Examiner*—Betelhem Shewareged
(74) *Attorney, Agent, or Firm*—Lynne M. Blank

(57) ABSTRACT

The present invention relates to an image receiver element comprising a single low density layer, wherein the single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C. The invention relates to a method of forming such an image receiver element, a printing system comprising an imaging material and the image receiver element, and a method of printing comprising obtaining an imaging material comprising a colorant layer; obtaining the image receiver element; superposing the colorant layer with the receiver element; and transferring colorant from the imaging material to the image receiver element.

25 Claims, No Drawings

FOAMED IMAGE RECEIVER

FIELD OF THE INVENTION

This invention relates to a low density non-crosslinked aliphatic polyester image receiver or receiving layer.

BACKGROUND OF THE INVENTION

In order for an imaging medium to be widely accepted by consumers for imaging applications, such as photographic prints, it has to meet requirements for preferred basis weight, caliper, stiffness, smoothness, gloss, whiteness, and opacity. Imaging media with properties outside the typical range for 'imaging media' suffer low consumer acceptance.

It is important, therefore, for an imaging medium to simultaneously satisfy several requirements. One commonly used technique for simultaneously satisfying multiple requirements is to use composite structures, wherein each layer or the structure, individually or synergistically, serves one or more functions. To form a composite or layered structure, multiple operations are required in order to manufacture each layer and assemble all of the individual layers into a single imaging medium.

Imaging media typically include at least a base or support layer, and an imaging layer. The support can include raw paper base, polymeric materials, or both. One type of imaging layer is an image receiving layer. The image receiver elements known in the art require at least an image receiving layer and a support, at least one of which is porous or non-porous, that is, swellable. See, for example U.S. Pat. Publ. No. 2007/0003713 at [0026]-[0027]; U.S. Pat. Publ. No. 2005/0191444; U.S. Pat. Publ. No. 2007/0054070. The imaging layer typically comprises one or more polymeric material, and may include additional additives, such as colorants, brighteners, antistatic agents, anticurl agents, or slip agents or lubricants. Imaging media can also include cushioning layers, adhesive layers, slip layers, anticurl layers, antistat layers, or other functional layers as needed, depending on the type of imaging operation.

The inclusion of multiple different layers of different materials requires multiple materials, multiple manufacturing steps, identification of materials that adhere sufficiently or use of adhesive layers, and inhibits recycling efforts. Furthermore addition of multiple layers to carry out different functions in an image receiver introduces different failure interfaces during finishing (U.S. Pat. Nos. 7,143,674 and 7,179,523). The inclusion of multiple different layers of different materials also reduces the ability to recycle imaging media. Current media cannot easily be recycled because they are typically composites of raw paper base and polymeric materials, and cannot be recycled using standard polymer recovery processes or paper recovery processes.

To reduce the number of layers in an imaging medium, polymer foams or voided polymers can be used. These material can be referred to as "voided," "foamed," "cellular," or "expanded" polymers or plastics.

There are many examples of voided receiving layers. For example, U.S. Pat. No. 5,084,334 discloses a voided polyester film having a non-compatible blend of polyester resins in which voids are formed around fine particles. Particles sizes are dispersed in a manner that provides a concentration of finer particle near the surfaces and a larger particle size near the central part of the polyester core in order to provide a different amount of voiding at the surface as opposed to the core when biaxially stretched. The film can be used in forming labels. U.S. Pat. No. 6,379,780 to Laney et al., U.S. Pat. Nos. 6,489,008, and 6,409,334 to Campbell et al. disclose an inkjet recording element comprising an ink-permeable polyester substrate comprising a base polyester layer and an ink-permeable upper polyester layer, the upper polyester layer comprising a continuous polyester phase having an ink absorbency rate resulting in a dry time of less than about 10 seconds and a total absorbent capacity of at least about 14 cc/m$^2$, the substrate having thereon a porous image-receiving layer having interconnecting voids. U.S. Pat. No. 5,443,780 to Matsumoto et al. discloses the use of an oriented film of polylactic acid and methods for producing the same. U.S. Pat. No. 5,405,887 to Morita et al. discloses breathable, hydrolysable, porous films made by a process comprising adding finely powdered filler having an average particle size of 0.3 to 4 μm to a polylactic acid based resin. Such films are described as useful as a material for leak proof films of sanitary materials and packaging materials. Such materials are, therefore, not open-pore in nature. Commonly assigned U.S. Pat. No. 7,074,465 to Campbell et al., hereby incorporated by reference in its entirety, disclose an inkjet recording element comprising a porous ink-receiving layer over and adjacent to an ink-permeable microvoided substrate layer comprising a polyester ionomer, said substrate layer comprising 5 to 70 percent by weight solids of a neutral polyester; 5 to 40 percent by weight solids of a polyester ionomer; and 25 to 65 percent by weight of a voiding agent, wherein the microvoided substrate layer and the porous ink-receiving microvoided layer both having interconnecting voids. In one preferred embodiment of the invention, the ink-permeable polyester microvoided substrate layer comprises sulfonated polyester and the ink-permeable microvoided layer comprising a continuous phase is a polylactic-acid-based material. U.S. Pat. Publ. No. 2005/0112302 discloses an inkjet recording element comprises a permeable microvoided polylactic-acid-containing layer having interconnecting voids. The invention is also directed to method of using such recording elements in an inkjet printing process and to sheets useful for making such inkjet recording elements and other media. U.S. Pat. Publ. No. 2007/0054070 discloses an inkjet recording element comprising a support extrusion coated with a porous hydrophilic material. The porous hydrophilic receiving layer may be applied over a microvoided polylactic-acid-containing base layer containing interconnected voids to efficiently absorb the printed inks commonly applied to ink-jet imaging supports without the need of multiple processing steps and multiple coated layers. U.S. Pat. No. 7,078,367 discloses a thermal dye-transfer dye-image receiving element comprising a thermal dye-transfer receiver element comprising a dye-receiving layer on a microvoided substrate layer containing a polylactic-acid-based material and an optional support layer. In order for the polylactic acid layer to receive imaging material, the microvoids are interconnected. Col. 7, lines 35-45. U.S. Pat. Publ. No. 2005/0112351 discloses a reflective optical film comprising a layer containing a polylactic acid voided with inorganic particles in a size and an amount sufficient to provide a visible light reflectivity of at least 96%. [0076] discloses an absorbent dye receiving layer. JP 2001-213058A and JP 2001-138644A disclose use of an image receiving layer having hollow particles on a base layer. U.S. Pat. Nos. 6,863,939, 6,703,193 and 6,867,168 relate to imaging elements comprising a microvoided layer comprising a continuous phase polyester matrix having dispersed therein crosslinked organic microbeads and non-crosslinked polymer particles that are immiscible with the polyester matrix of said microvoided layer. U.S. Pat. Publ. No. 2006/0204685 and 2006/0204686 disclose an inkjet recording element comprising, from top to bottom, a fusible, porous layer comprising a mixture of fusible reactive polymer particles that comprise a thermoplastic polymer, with at least two reactive functional groups on two different particles in the mixture are capable of crosslinking with each other in the different particles on a support. Optionally, an ink-carrier-liquid receptive layer is present between the fusible, porous layer and the support. The support may include polylactic acid polymer. U.S. Pat. No. 7,198,363 discloses an inkjet recording element having a support bearing a fusible, porous layers of fusible polymeric particles and binder. U.S. Pat. Publ. No. 2007/0003713 discloses a method of printing on an inkjet recording element. The element is formed by a support having thereon in order: a) a porous upper fusible layer of fusible polymeric materials and a binder, b) a porous ink-receiving layer in which pigmented ink is stratified such that, after fusing the printed element, greater than 50% of the printed pigment colorant particles in the inkjet ink composition is retained in the bottom half of the upper porous fusible layer. One polymer used in the porous support is polylactic acid (PLA). [0026-27][0066-67]

There are many examples of voided intermediate layers. U.S. Pat. Publ. Nos. US 2005/0187104 A1, US 2005/0187105 A1, and US 2005/0187106 A1 are directed to thermal dye-transfer imaging elements, such as labels, having a polylactic acid microvoided intermediate layer with a dye-receiving layer on one side, and an optional substrate on the opposite side of the microvoided layer. U.S. Pat. Publ. No. 2006/0204684 discloses an inkjet recording element comprising a support having thereon in order, from top to bottom, a fusible, porous layer comprising fusible multifunctional polymer particles derived from an aqueous dispersion that comprise a thermoplastic polymer with at least two reactive functional groups capable of crosslinking with each other. The element contains a microvoided layer with interconnecting pores, which starts porous, then becomes a fused, continuous, image-containing layer [0076] on a separate support. [0094] U.S. Pat. Publ. No. 2007/0031615 relates to a printing media comprising a first side comprising a first exposed layer comprising a mixture of polyolefin and at least one member selected from the group consisting of polyolefin copolymers, amide containing polymers, and ester containing polymers, wherein a measured Tg of said exposed layer comprises a Tg of less than 5 degrees C. and a second side comprising an a second exposed layer having an advancing contact angle with water of less than 90 degrees. The media may include a polylactic acid polymer (PLA).

There are many examples of foamed receiving elements. U.S. Pat. Appl. Publ. Nos. US 2005/0181196 A1 and 2005/0191569 A1, and U.S. Pat. Nos. 6,447,976 B1, 6,514,659, and 6,787,217 B2, all disclose imaging elements having a closed-cell foam core and at least one flange layer adjacent the foam core. In each case, an image receiving layer is placed on the opposite side of the flange layer from the foam core. U.S. Pat. Nos. 6,566,033, 6,537,656, 6,447,976, and U.S. Pat. Publ. Nos. 2003/0219663 A1 and 2003/0152760 A1 also describe foam core elements for use in imaging applications. U.S. Pat. Publ. No. US 2004/0229966 A1 and U.S. Pat. No. 6,958,365 are directed to open celled microcellular foam which can be used as the image-receiving layer in a structure comprising a support, an absorbing layer on the support, and the image-receiving layer on the absorbing layer. U.S. Pat. Publ. No. 2004/0119189 relates to a method for placing indicia on a flanged, closed cell foam support for an imaging element, wherein the imaging element comprises the support and at least one imaging layer. The invention also relates to a method for placing indicia on a support for an imaging element comprising providing a support wherein the support comprises a closed cell foam core layer and adhered thereto at least one flange layer, wherein the closed cell foam core layer comprises a polymer that has been expanded through the use of a blowing agent, and placing indicia on the closed cell foam core layer.

U.S. Pat. Publ. No. 2004/0258857 relates to an imaging element having long term stability comprising at least one imaging layer and a support. The support comprises at least one layer comprising polylactic acid (PLA). The imaging support and imaging layers are separate layers. U.S. Pat. Nos. 7,094,733 and 7,078,368 disclose thermal-dye-transfer labels, and pre-label media from which they are made, comprise a dye receiving layer on an extruded pragmatic polymer film comprising a microvoided layer, a continuous phase of which comprises a polylactic-acid-based material wherein the microvoids are formed by employing relatively smaller size void initiators, including, for example, various inorganic particles such as titanium dioxide.

It is desirable to lessen the number of layers in the support, number of manufacturing processes used to create the layers; and also reduce the amount of materials used in a receiving element to reduce overall manufacturing costs, to reduce issues associated with laminating or adhering materials, and to enable recycling, while maintaining the range of typical properties for 'imaging media'.

SUMMARY OF THE INVENTION

The present invention relates to an image receiver element comprising a single low density layer, wherein the single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C. The present invention also relates to a method of forming an image receiver element comprising obtaining a polyester resin; modifying the polyester resin to produce a non-crosslinked aliphatic polyester resin having a $T_g$ of 40-70° C.; and forming a single low density layer by reducing the density of the modified non-crosslinked aliphatic polyester resin to form an image receiver element comprising a single layer, wherein the single low density layer comprises non-crosslinked aliphatic polyester resin having a $T_g$ of 40-70° C. containing non-interconnected void space, and wherein the single low density layer does not absorb more than 3 weight % moisture at 80% RH and 21.3° C. as compared to the weight % moisture of said single low density layer at 20% RH and 21.3° C. (close to room temperature). The present invention further relates to a printing system comprising an imaging material and an image receiver element, wherein the imaging material comprises a colorant capable of transfer to the image receiver element, and wherein the image receiver element comprises a single low density layer, wherein the single low density layer is capable of receiving dye transfer by heat and diffusion and comprises non-crosslinked aliphatic polyester containing non-interconnected void space, and wherein the single tow density layer does not absorb more than 3 weight % moisture at 80% RH and 21.3° C. as compared to the weight % moisture of said single low density layer at 20% RH and 21.3° C. (around room temperature) and a method of printing, comprising obtaining an imaging material comprising a colorant layer; obtaining an image receiver element comprising a single low density layer, wherein the single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C.; superposing the colorant layer with the receiver element; and transferring colorant from the imaging material to the image receiver element.

ADVANTAGEOUS EFFECT OF THE INVENTION

This invention has numerous advantages, not all of which are incorporated into a single embodiment. A low density article having a high degree of stiffness, excellent smoothness, high opacity, whiteness, and excellent humidity-independent curl resistance is provided. Most preferably an imaging element, can be manufactured using a single in-line operation, and can be effectively recycled, significantly lowering manufacturing costs. The article can be used as a single layer, which acts as both receiver and support at the same time, avoiding delamination problems and finishing issues for laminated structures known in the art. The article can be used as a printable packaging material, providing a cushioning, printable layer without delamination problems. These and other advantages will be apparent from the detailed description below.

DETAILED DESCRIPTION OF THE INVENTION

The present invention relates to a low density polyester layer and methods of making the same, wherein the polyester layer is suitable for use as an image receiver or receiving layer and a support in a single layer. The use of a single layer element reduces manufacturing costs, and eliminates manufacturing problems such as interlayer adhesion and, correspondingly, delamination of multiple layers. In the low density polyester layer of the present invention, density is reduced in such a way that the pore or void space is not interconnected. As a result, the polymer layer of low density, non-crosslinked, aliphatic polyester is not permeable and does not absorb significant moisture at 80% RH and 21.3° C. In the prior art, pore or void space is typically interconnected to form a porous layer. See, for example U.S. Pat. Publ. No. U.S. Pat. Publ. No. 2007/0003713 at [0026]-[0027] and [0066]-[0067].

For purposes of the present invention, moisture permeability is defined in terms of moisture pickup or uptake at 80% RH and 21.3° C. For calculation purposes the sample weight at 20% RH and 21.3° C. is the reference sample weight used. Moisture uptake or pickup is measured using a humidity generator. Typically such an instrument has a chamber whose humidity can be controlled and where the humidity can be ramped in a prescribed cycle for a given temperature. The instrument typically has a sensitive balance such as a CAHN Microbalance to which is attached a wire that enables hanging of a sample in the chamber. The balance records the weight of the sample for a given humidity and temperature. Thus one can determine moisture uptake by the sample as a function of humidity condition used at a given temperature.

It is understood by one of ordinary skill in the art that a conventional imaging element comprises a support bearing at least one imaging layer. For purposes of the present invention, the inventive imaging element, also referred to as an image receiver or an image receiver element, comprises a single layer capable of serving as both support and image receiver in one or the same layer. Thus the present low density aliphatic polyester layer performs a dual function.

It is also well known by those of ordinary skill in the art that paper supports suffer from moisture uptake. The absorptive paper base is frequently coated with polymer layers to reduce the moisture uptake, as the polymer absorbs less, if any, amounts of moisture, as compared to the paper base itself. See, for Example, U.S. Pat. No. 7,241,355 (col. 10, lines 37-40); see also U.S. Pat. No. 7,008,760 (col. 173, line 30-col. 176, line 32).

The polyester may be any polyester usable as an imaging support or in an image receiving layer. Preferably, the non-crosslinked polyester can be a polyalkonoate or branched aliphatic polyester which have a glass transition temperature between 40° C. and 70° C. In a preferred embodiment, the polyester is polylactic acid (PLA) or modified polylactic acid. In a preferred embodiment, the imaging support or the image receiver layer has a glass transition temperature between 47° C. and 60° C.

Modification of the polyester can include addition of one or more copolymers having compatible comonomers, such as one or more hydroxycarboxylic acids. Exemplary hydroxycarboxylic acid includes glycolic acid, hydroxybutyric acid, hydroxyvaleric acid, hydroxypentanoic acid, hydroxycaproic acid, and hydroxyheptanoic acid. The polyester preferably comprises 85 to 100% by weight of a polylactic-acid-based polymer ("PLA-based polymer"). The polylactic acid (PLA)-based polymer preferably comprises from 85 to 100 mol % of lactic-acid units (preferably derived from L-lactic acid) and, optionally, other polymerization compatible comonomers. Preferably, the polylactic acid (PLA)-based polymer comprises at least 85 mole percent, more preferably at least 90 mole percent, most preferably at least 95 mole percent of lactic-acid monomeric units whether derived from lactic acid monomers or lactide dimers. The polyester can be modified to achieve the desired glass transition temperature range of 35-65° C.

Modification of the aliphatic polyester, like polylactic acid, can include modification of the backbone or one or more side chain of the polymer, for example, branching caused by introducing branched polyols, epoxidized hydrocarbon or epoxidized natural oil, hydroxycarbonate initiators, mevalonic lactone iniator during polymerization, blending with poly(e-caprolactone) in presence of a catalyst like triphenylphosphite, or treating with small amounts of peroxide.

Polylactic acid, also referred to as "PLA," includes polymers based essentially on single D- or L-isomers of lactic acid, or mixtures thereof. In a preferred embodiment, polylactic acid (PLA) is a thermoplastic polyester of 2-hydroxyl lactate (lactic acid) or lactide units. The formula of the unit is: —[O—CH(CH$_3$)—CO]—. The alpha-carbon of the monomer is optically active L-configuration). The polylactic-acid-based polymer is typically selected from the group consisting of D-polylactic acid, L-polylactic acid, D,L-polylactic acid, meso-polylactic acid, and any combination of D-polylactic acid, L-polylactic acid, D,L-polylactic acid, and meso-polylactic acid. In one embodiment, the polylactic acid-based material includes predominantly PLLA (poly-L-lactic acid). In one embodiment, the number average molecular weight is between about 15,000 and about 1,000,000.

The various physical and mechanical properties vary with change of racemic content, and as the racemic content increases, the polylactic acid (PLA) becomes amorphous, as described, for example, in U.S. Pat. No. 6,469,133, the contents of which are hereby incorporated by reference. In one embodiment, the polymeric material includes relatively low (less than about 5%) amounts of the racemic form of the polylactic acid. When the polylactic acid (PLA) content rises above about 5% of the racemic form, the amorphous nature of the racemic form may alter the physical and/or mechanical properties of the resulting material.

Additional polymers can be added to the polyester material so long as they are compatible with the polyester. Compatibility is miscibility (defined as one polymer being able to blend with another polymer without a phase separation between the polymers) such that the polymer and the polyester are miscible under conditions of use. Typically, polymers with some degree of polar character can be used. Suitable polymeric resins that are miscible with polyester, such as, a polylactic acid polymer, can include, for example, polyvinyl chloride, polyethylene glycol, polyglycolide, ethylene vinyl acetate, polycarbonate, polycaprolactone, polyhydroxylkanoates (polyesters), polyolefins modified with polar groups such as maleic anhydride and others, ionomers, e.g. SURLYN® (DuPont Company), epoxidized natural rubber, and other epoxidized polymers.

In one embodiment of the present invention, a polylactic acid comprises a mixture of at least 90%, preferably about 96% poly(L-lactic acid) and at least 15%, preferably about 4% poly(D-lactic acid), which is preferable from the viewpoint processing durability.

The polyester can include a plasticizer. Typical plasticizers include phthalates, adipates, azelates, and the like. Examples of such plasticizers include esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol diperlargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffin, high molecular weight hydrocarbon condensates and the like can also be used. In the case of polylactic acid (PLA), plasticizers like polyethylene oxide, polyethylene glycol, poly(1,3 butanediol), dibutyl sebacate, acetyl glycerol monolaurate, glucose monoesters, partial fatty acid esters and tributyl citrate may be used. Furthermore, choice of plasticizer can be determined by the ability of the plasticizer to improve processability, flexibility and ductility or in other words its ability to depress melting point and crystallinity in the case of semi-crystalline polymers. The plasticizer or blend of plasticizers is chosen to yield a composition of the desired viscosity and/or foaming characteristics as well as altering glass transition temperature ($T_g$). A plasticizer can be used in an amount of 0 weight % to 15 weight %, preferably 0 weight % to 10 weight %.

The present invention also relates to a method of forming an image receiver element comprising obtaining a polyester resin; modifying the polyester resin to produce a non-crosslinked aliphatic polyester resin having a $T_g$ of 40-70° C.; and forming a single low density layer by reducing the density of the modified non-crosslinked aliphatic polyester resin to form an image receiver element comprising a single layer, wherein the single low density layer comprises non-crosslinked aliphatic polyester resin having a $T_g$ of 40-70° C. containing non-interconnected void space, and wherein the single low density layer does not absorb more than 3 weight % moisture at 80% RH and 21.3° C. as compared to the weight % moisture of said single low density layer at 20% RH and 21.3° C. (around room temperature). Most preferably, the low density layer, used as the image receiving layer, is an extruded layer.

The density of the polyester can be reduced by known methods, such as foaming, voiding, or inclusion of hollow particles, such as microbeads. In the present invention, density is reduced in such a way that the pore or void space is not interconnected. As a result, the low density aliphatic polyester layer is not permeable and does not absorb moisture at 80% RH and 21.3° C. The range in density reduction can be from 20% to 95%, for example, from 40% to 70%. Density reduction in percentage is the ratio of the difference between a solid polymer and a particular foam sample of the solid polymer multiplied by 100.

The low density polyester layer can have a density of from 0.6 gm/cc to 1.1 gm/cc, for example, from 0.7 gm/cc to 1 gm/cc. The low density polyester layer, if oriented, can have a stiffness in a machine direction of from 70 mN to 550 mN, for example, 100 mN to 300 mN, and in a cross direction of from 60 mN to 300 mN, for example, 100 mN to 250 mN. The low density polyester layer, if oriented, can have a modulus in one planar direction from 150,000 psi to 450,000 psi and modulus in the other planar direction from 100,000 psi to 300,00 psi. Preferable the direction with higher modulus is the machine direction (MD) and the lower modulus is the transverse direction (TD) or cross direction (CD). Furthermore, the ratio (MD:CD) of modulus in planar direction is 3.5:1 to 1:3.5. Preferable ratio of the modulus is 2.5:1 to 1:2.5. The low density polyester layer can have a thickness of from 25 μm to 300 μm, for example, from 125 μm to 250 μm. A thicker or thinner layer of polyester can be formed depending on use, and desired stiffness. For example, if the low density polyester is used as a receiving layer within a composite forming a packaging material, a thinner polyester layer may be desired than if the polyester layer were used alone as the entire packaging material, or as an image receiver. The caliper (thickness) of the polyester layer is determined by the respective flexural modulus such that the overall stiffness of the article lies within the preferred range, and the bending moment around the central axis is balanced to prevent excessive curl. The suitable range in caliper (thickness) of an image receiver can be between 25 and 400 μm. Such an article can be used for a variety of application such as packaging, printing media for labels, packages, printing paper, synthetic paper and imaging elements. Exemplary polyester image receivers have a thickness of from 100 μm to 400 μm. The range is determined by (a) consumer preference, (b) manufacturability, and (c) materials selection.

The low density aliphatic polyester layer can have a smoothness (characterized here as roughness average, $R_a$) of from 0.1 μ/m to 2.2 μm. Roughness average or $R_a$ is defined as average distance between each roughness profile point and the meanline. For example, when used as an image receiver, the surface of the low density polyester layer on which an image is printed (an image side) can have a smoothness of from 0.15 μm to 1.65 μm, for example, from 0.25 μm to 1.2 microns. Both sides of the low density polyester layer can have the same smoothness. Both sides of the low density polyester layer are capable of receiving an image and can be imaged or printed in whole or in part, forming a two-sided print. Back-printing or imaging can include logos and other information, as well as written information applied by the end-user. This can be used in packaging materials, prints of images, postcards, ID cards, tickets, back-printed or other double-sided items.

A side of the low density polyester layer opposite the image side can be referred to as a transport side, and can have a smoothness equal to or less than that of the image side. Smoothness can be characterized as roughness average ($R_a$), where it is computed as the average distance between each roughness profile point and the meanline. Another roughness or smoothness parameter is $R_z$, which is the average peak to valley roughness (ISO and ASME 1995 and later) based on one peak and one valley per sampling length. For example, where the low density polyester layer is a receiving layer, the image side can have a $R_a$ of about 0.1 µm to 2.2 µm, for example, from 0.1 µm to 1.4 µm, and the transport side can have a $R_a$ of about 0.4 µm to 1 µm and $R_z$ of about 1.5 µm to 5 µm, to allow picking and transport through a printing mechanism. To change the smoothness of the transport side, the transport side can be embossed, etched, calendared or cooled slowly during the processing.

A carrier layer can be added to the transport side of the low density polyester layer. The carrier layer can be removable or permanent. The carrier layer can have sufficient roughness on the side opposite the low density polyester layer to properly transport the low density polyester layer through manufacturing, packaging equipment, or printing apparatus, such as a thermal printer or electrophotographic printer.

The low density polyester layer is opaque. The low density polyester layer can be colored, for example, by addition of colored particles or dyes. The process of voiding, foaming, or adding hollow particles can provide a white or pearlescent appearance to the low density polyester layer. When used as an image receiver, the low density polyester layer desirably has an opacity of at least 50%, for example, greater than 70%. Opacity is a function of thickness. To take into account thickness, a term called normalized opacity is defined. This is the ratio of opacity to thickness of low density polyester layer as measured in microns. The normalized opacity should range from 0.125 to 4 while maintaining the opacity constraints. Preferred normalized opacity should range from 0.25 to 1. When used as an image receiving layer, the low density polyester layer can appear white. Optical properties such as opacity and colorimetry can be met by the appropriate use of filler materials such as titanium dioxide and calcium carbonate and colorants, tints, dyes and/or optical brighteners or other additives known to those skilled in the art. Any suitable colorant can be used. For example, suitable whitening agents can include, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, talc, or combinations thereof. Suitable optical brighteners include those described in *Research Disclosure*, Vol. No. 308, December 1989, Publication 308119, Paragraph V, page 998.

Various additives can be added to the low density polyester layer. Antioxidants, slip agents, lubricants, light stabilizers, stick preventative agents, antistat agents, and anticurl agents, for example, can be added to the polyester.

The low density aliphatic polyester layer can be a closed cell foamed polyester layer. The range in density reduction can be from 20% to 95%, for example, from 40% to 70%. The polyester can be foamed with a consistent density, or with a gradient. For example, the foamed polyester can have a density gradient that increases from the center to one or more surface of the foamed polyester.

Foamed polyester can be formed using any known methods, for example, mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents, generating gases such as nitrogen or carbon dioxide by the application of heat, or through exothermic heat of reaction during polymerization. Physical methods include such techniques as the expansion of a gas dissolved in a polymer mass upon reduction of system pressure, the volatilization of low-boiling liquids such as fluorocarbons or methylene chloride, or the incorporation of hollow microspheres in a polymer matrix. The choice of foaming technique is dictated by desired foam density reduction, desired properties, and manufacturing process. Preferred physical blowing agent can include carbon dioxide, nitrogen, argon, hydrocarbon, water or mixtures thereof, as these offer a low cost and environmentally friendly means of achieving foam in a polymer system, but other gases could potentially be used as well. Exemplary methods are set forth, for example, in U.S. Pat. Appl. Pub. No. US 2005/0181196 A1, incorporated herein by reference.

To form a foamed polyester, one or more polyester, a blend or copolymer, can be used as a matrix polymer with a chemical blowing agent such as sodium bicarbonate, citric acid, organic acid salts, azodicarbonamide, azobisformamide, azobisisobutyroInitrile, diazoaminobenzene, 4,4'-oxybis(benzene sulfonyl hydrazide) (OBSH), N,N'-dinitrosopentamethyltetramine (DNPA), sodium borohydride, other blowing agent agents well known in the art, or combinations thereof. Exemplary chemical blowing agents can include sodium bicarbonate, citric acid, sodium bicarbonate/citric acid mixtures, citrate esters or mixtures with sodium bicarbonate, and azodicarbonamide.

The foaming agent can be used with an auxiliary foaming agent, nucleating agent, or a cross-linking agent. To enhance the formation of foam, a nucleating agent can be added to the polyester. The nucleating agent can be added at less than 3% by weight of the polyester. Nucleating agents useful in this method can include one or more inorganic particle. In particular, talc has been found to provide good nucleating properties. It is desirable to have particles having a diameter of less than 10 µm, for example, from 0.1 to 3 µm. Particles with a diameter less than 0.1 µm tend to have limited nucleating properties while particles with a diameter larger than 3 µm form larger areas of foam that cause non-uniform densities. Large non-uniforms areas are less desirable because they can cause unwanted surface roughness or pits in the surface of the foamed layer.

In a preferred embodiment, the foamed polyester layer is oriented. The coextrusion, quenching, orienting, and heat setting of axially oriented sheets may be effected by any process which is known in the art for producing oriented sheet, such as by a casting and stretching process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is oriented by stretching in at least one direction at a temperature above the glass transition temperature of the polymer(s). In uniaxial orientation the film is stretched in only one direction, it could be the machine direction or the transverse direction. In biaxial orientation, the sheet is stretched in mutually perpendicular directions at a temperature above the glass transition temperature of the polymer(s). The sheet may be stretched in one direction and then in a second direction or may be simultaneously stretched in both directions. In uniaxial or biaxial orientation processes, typically after the sheet has been stretched, it is heat set by heating to a temperature sufficient to crystallize the polymers while restraining to some degree the sheet against retraction.

By altering the orientation ratio, the mechanical properties of the biaxially oriented sheet can be developed in just one direction or both directions.

The terms as used herein, "top", "upper", "emulsion side", and "face" mean the side or toward the side of the imaging support bearing the imaging layers. The terms "bottom", "lower side", and "back" mean the side or toward the side of the imaging support opposite from the side bearing the imaging layers or final/developed image.

The low density polyester layer may be formed by voiding. "Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=HCH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2-10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized. Suitable examples of voiding are set forth, for example in U.S. Pat. Appl. Pub. No. US 2005/0187104 A1, incorporated herein by reference.

Voided low density polyester layers can be formed by addition of a void-initiating particle, followed by stretching (orienting) in one or two directions. The voided polyester can be stretched in the machine direction, the transverse direction, or both sequentially or simultaneously, as described above.

Low density polyester layers can also be formed by the addition of hollow particles, such as microbeads or hollow spheres, to the polyester. The hollow particles can be polymeric. Exemplary hollow particles include those capable of expanding when subjected to heat, such as EXPANCEL® and DUALITE® beads or microspheres, because these particles further lower the density of the polyester without increasing the amount of density-lowering additive.

EXPANCEL® and DUALITE® microspheres are small spherical plastic particles. The microspheres consist of a polymer shell encapsulating a hydrocarbon. When the microspheres are heated, the polymer shell softens while the hydrocarbon expands, and increases its pressure. This results in a dramatic increase in the volume of the microspheres. When fully expanded, the volume of the microspheres increases more than 40 times with a corresponding decrease in its density. The temperature at which expansion starts as well as the temperature at which the maximum expansion and the lowest density is obtained depends to some degree on the heating rate. At temperatures above the temperature at which the highest expansion is obtained the microspheres gradually collapse. The microspheres are typically available in an unexpanded or expanded state. In thermoplastic melt processing it is preferable to use the microspheres in their unexpanded state. Similarly, for low density polyester layer manufacture, microspheres used should be in unexpanded state. Examples of hollow particle inclusion are described in JP 2001-213058 and JP 2001-138644.

The low density polyester layer can be used as an image receiver or image receiving layer. Most preferably, the low density polyester layer can be used in thermal imaging or electrophotographic imaging.

The present invention further relates to a printing system comprising an imaging material and an image receiver element, wherein the imaging material comprises a colorant capable of transfer to the image receiver element, and wherein the image receiver element comprises a single low density layer, wherein the single low density layer is capable of receiving dye transfer by heat and diffusion and comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C. and a method of printing, comprising obtaining an imaging material comprising a colorant layer; obtaining an image receiver element comprising a single low density layer, wherein the single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C.; superposing the colorant layer with the receiver element; and transferring colorant from the imaging material to the image receiver element. A second imaging material comprising a second colorant layer may be superposed with the opposing or second side of the image receiver, and the second colorant transferred from the second imaging material to the second side of the image receiver, thereby forming an element imaged or bearing images on both sides of the low density receiving layer. The preferred printing systems are thermal printer systems or electrophotographic systems.

For thermal imaging, a dye-donor element suitable for use with the image receiver described herein can be any thermal dye-donor element. The dye-donor element can include a dye-donor layer on a substrate. The dye-donor layer can include one or more colored areas (patches) containing dyes suitable for thermal printing. As used herein, a "dye" can be one or more dye, pigment, colorant, or a combination thereof, and can optionally be in a binder or carrier as known to practitioners in the art. During thermal printing, at least a portion of one or more colored areas can be transferred to the image receiver, forming a colored image on the receiver. The dye-donor layer can include a laminate area (patch) having no dye. The laminate area can follow one or more colored areas. During thermal printing, the entire laminate area can be transferred to the receiver. The dye-donor layer can include one or more colored areas and one or more laminate areas. For example, the dye-donor layer can include three color patches, for example, yellow, magenta, and cyan, and a clear laminate patch, for forming a three color image with a protective laminate layer on a receiver element.

Any colorant transferable by heat can be used in the donor layer of the donor element. The colorant can be selected by taking into consideration hue, lightfastness, and solubility of the colorant in the dye donor layer binder and the dye image receiving layer binder.

The dye-donor layer can be formed or coated on a support. The dye-donor layer can be formed on the support by a printing technique such as but not limited to a gravure process, spin-coating, solvent-coating, extrusion coating, or other methods known to practitioners in the art. The support can be formed of any material capable of withstanding the beat of thermal printing. According to various embodiments, the support can be dimensionally stable during printing.

The dye-donor element can additionally include a slip layer, one or more tie or adhesive layer, a release agent, stick preventative agent, or antistat agent.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The dye-donor element and image receiver described herein, when placed in superposed relationship such that the dye-donor layer of the dye-donor element is adjacent one side of the image receiver, can form a print assembly. An image can be formed by passing the print assembly past a print head, wherein the print head is located on the side of the dye-donor element opposite the receiver element. The print head can apply heat image-wise to the dye-donor element, causing the dyes in the dye-donor layer to transfer to the image receiver. Thermal print heads that can be used with the print assembly are available commercially and known to practitioners in the art. Exemplary thermal print heads can include, but are not limited to, a Fujitsu Thermal Head (FTP-040 MCSOO1), a TDK Thermal Head F415 HH7-1089, a Rohm Thermal Head KE 2008-F3, a Shinko head (TH300U162P-001), and Toshiba heads (TPH162R1 and TPH207R1A).

When a multiple-color image is to be obtained, the print assembly is formed as many times as there are colors to be printed during the time when heat is applied by the thermal print head. After the first dye is transferred from a first dye-donor element, the first dye-donor element and receiver can be peeled apart. A second dye-donor element (or another area of the dye-donor element with a different dye) can be brought into register with the receiver and the process can be repeated until all colors are printed. A laminate patch can also be printed on the image in this manner to protect the image.

When used as an image receiver element for electrophotographic processes, the imaging process includes creating an electrostatic image, developing that image with charged, colored particles (toner), optionally transferring the resulting developed image to a secondary substrate, and fixing the image to the image receiver. There are numerous variations in these processes and basic steps as known in the art, including the use of both liquid and dry toners.

The low density polyester layer can be subjected to any number of treatments, after extrusion, coextrusion, orientation, or between casting and full orientation, to improve various properties, such as printability, barrier properties, or heat-sealability. Examples of such treatments can include flame, plasma and corona discharge treatment to improve printability. Further examples of treatments can be calendaring, embossing, and patterning to obtain specific effects on one or more surface.

The low density polyester layer can be produced in sheet or roll form, depending on manufacturing capabilities, end use, or a combination thereof. When used as packaging material, roll form may be desirable for continuous packaging, where cutting is done during the packaging operation. When used as an image receiver, sheet form may be desirable for use in single sheet printers, although roll fed printers with cutting mechanisms are also used. The low density polyester layer may be used as an imaging element capable of being imaged on one or both sides, or an imaged packaging film. Such an article can be used for a variety of application such as packaging materials, printing media for labels, packages, printing paper, synthetic paper, prints of images, postcards, ID cards, tickets, or other double-sided items and imaging elements.

The following examples illustrate the practice of this invention. They are not intended to be exhaustive of all possible variations of the invention. Parts and percentages are by weight unless otherwise indicated.

EXAMPLES

The samples created by this invention were characterized for caliper (thickness), density, surface roughness, opacity and stiffness. Stiffness was measured using a Lorentzen and Wetter (L&W) type tester according to Tappi Method T556. The bending resistance in milliNewtons (mN) of a 20 mm wide vertically clamped sample was measured for a 15° deflection angle. Surface roughness of the roll surfaces was measured using a Mahr Perthometer M2 with a skidded, 2 μm radius diamond probe. The polymeric sheet or film surface roughness was measured using both a Mahr Concept 5000, with an unskidded 2 μm diamond probe, and using a Zygo New View 5000 interferometric microscope.

Opacity was measured according to ASTM method E308-96, specular reflectance was included, and the testing was done by measuring one sheet black by black and then black by white (Baryta).

Some of the samples were characterized for moisture pickup or uptake. This was carried out in a humidity chamber. The chamber used is a Thunder Scientific, two pressure humidity generator. The instrument used has a CAHN Microbalance attached to it with a wire that enables hanging of a sample in the chamber. The balance records the weight of the sample for a given humidity and temperature.

The resins used for this invention were characterized for rheology using the ASTM D1238 technique for melt index or using the RMS800 (Rheometrics Mechanical Spectrometer) with 25 mm diameter parallel plates using a fixed gap of 1.5 mm for determining viscosity versus frequency or shear rate.

Samples were printed using a thermal donor whose dye patches were made up of Aqualon N50 ethyl cellulose (48.0-49.5% ethoxyl content) a polymeric binder from Hercules Chemical and also contained Paraplex G25 polyester sebacate ($T_m$ is 20° C., $M_w$ is 8000) from CP Hall Company.

The dye-donor element for use was prepared by coating the following layers in the order recited on a first side of a 4.5 micron poly(ethylene terephthalate) support:

(1) for the dye patches a subbing layer of a titanium alkoxide (Tyzor® TBT from E.I DuPont de Nemours and Company) (0.16 g/m²) from n-propyl acetate and n-butyl alcohol solvent mixture; and (2) a dye-donor layer containing a composition of yellow dyes where the dye to binder ratio was 0.71;

(3) a dye-donor layer containing a composition of magenta dyes where the dye to binder ratio was 1.04;

(4) a dye-donor layer containing a composition of cyan dyes where the dye to binder ratio was 1.49;

(5) a transferable overcoat layer containing colloidal silica IPA-ST (Nissan Chemical Co.), Tinuvin® 460 (Ciba Specialty Chemicals), a UV-absorbing triazine, poly(vinyl acetal), KS-10, (Sekisui Co.), and 4 μm divinylbenzene beads.

The yellow dye patch contained dyes Y1 and Y2.

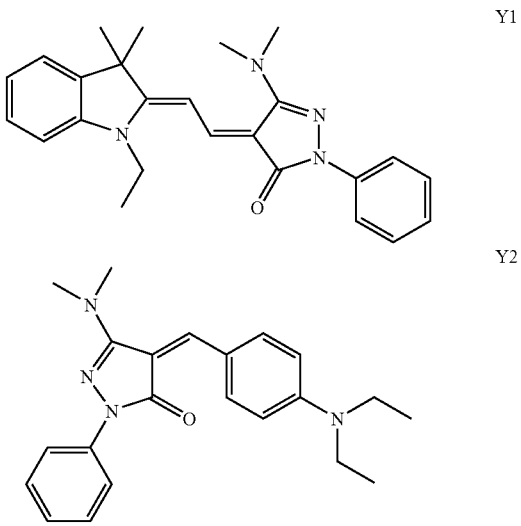

The magenta dye patch contained dyes M1, M2 and M3

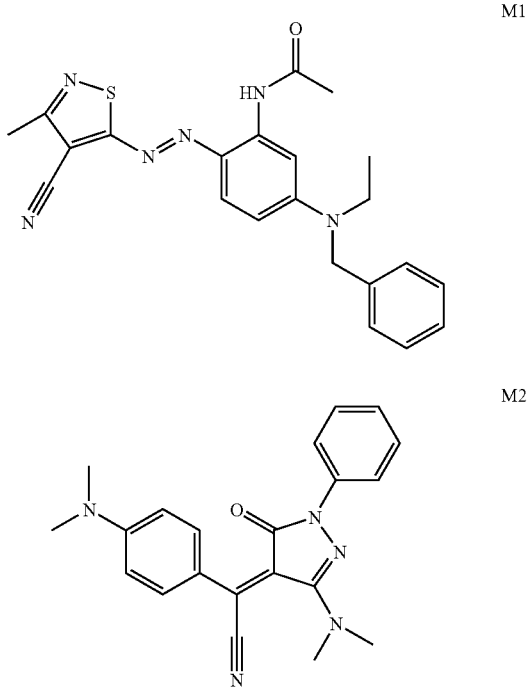

-continued

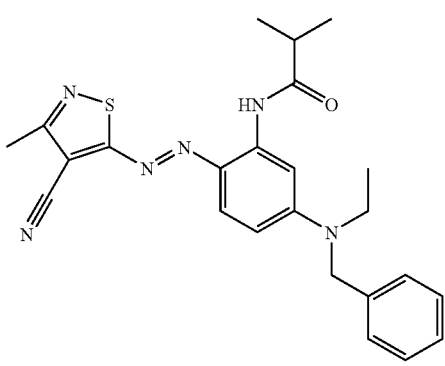
M3

The cyan dye patch contained dyes, C1, C2 and C3.

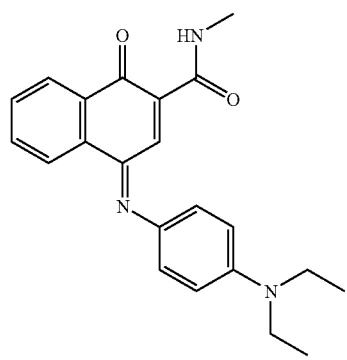
C1

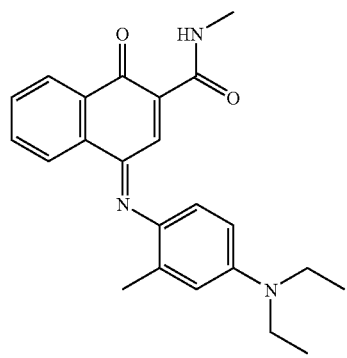
C2

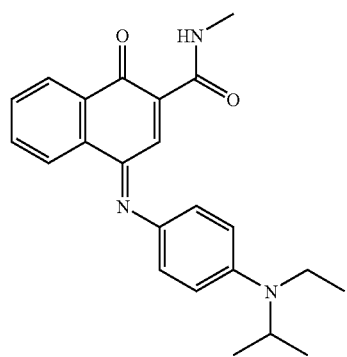
C3

On a second side of the support, a slipping layer was prepared and it contained an ethylene polymer of Polywax® 400 (0.02 g/m$^2$), a polyalphaolefin of Vybar® 103. (0.02 gm/m$^2$), and a maleic anhydride copolymer of Ceremer 1608 (0.02 gm/m$^2$), all from Baker-Petrolite Polymers, Sugar Land, Tex., and a poly(vinyl acetal) binder (0.41 gm/m$^2$) (KS-1 from Sekisui, Japan) coated from a solvent mixture of 75 wt. % toluene, 20 wt. % methanol, and 5 wt. % cyclopentanone.

Example 1

Voided Film with a Dye Receiver Layer—Control Receiver

In this example, a three layer biaxially oriented voided polypropylene film from Mobil (350K18) of caliper 33.02 μm was laminated to one side of raw paper base of caliper 132.08 μm. This forms the face side of the receiver. To balance the curl of the structure a biaxially oriented polypropylene film obtained from Mobil (70MLT) of caliper 17.78 μm was laminated to the other side of raw paper base. The total caliper of the structure was 213.36 μm. This base was then coated with a subbing layer and a thermal dye receiver layer. Samples of this structure were printed in a thermal printer at a line time of 5 millisec. During the printing process, the donor was in contact with the top layer of the three layer voided film.

Dye Receiving Layer (DRL)

Polyester E-2 (structure and making of branched polyester described in U.S. Pat. Nos. 6,897,183 at col. 15, line 3 to col. 15, line 32, incorporated herein by reference, and U.S. Pat. Nos. 7,091,157 at col. 31, line 23 to col. 31, line 51), incorporated herein by reference, was dried in a Novatech desiccant dryer at 43° C. for 24 hours. The dryer was equipped with a secondary heat exchanger so that the temperature will not exceed 43° C. during the time that the desiccant was recharged. The dew point was −40° C.

Lexan 151, a polycarbonate from GE, Lexan EXRL1414TNA8A005T, a polycarbonate from GE, and MB50-315 silicone from Dow Chemical Co. were mixed together in a 0.819:1:0.3 ratio and dried at 120° C. for 2-4 hours at −40° C. dew point.

Dioctyl Sebacate (DOS) was preheated to 83° C., and phosphorous acid was mixed in to make a phosphorous acid concentration of 0.4%. This mixture was maintained at 83° C. and mixed for 1 hour under nitrogen before using.

These materials were then used in the compounding operation. The compounding was done on a Leistritz ZSK 27 extruder with a 30:1 length to diameter ratio. The Lexan-polycarbonates/MB50-315-silicone material was introduced into the compounder first, and melted. Then the dioctyl sebacate/phosphorous acid solution was added, and finally the polyester was added. The final formula was 73.46% polyester, 8.9% LEXAN 151 polycarbonate, 10 wt. % Lexan EXRL1414TNA8A005T, 3% MB50-315 silicone, 5.33% DOS, and 0.02% phosphorous acid. A vacuum was applied with slightly negative pressure, and the melt temperature was 240° C. The melted mixture was then extruded through a strand die, cooled in 32° C. water and pelletized. The pelletized dye receiver was then aged for about 2 weeks. The dye receiver pellets were then predried before extrusion, at 38° C. for 24 hours in a Novatech dryer described above. The dried material was then conveyed using desiccated air to the extruder. The dye receiver pellets were melted in the extruder and heated to 265° C.

The tie layer used was compounded. PELESTAT 300 antistat polymer from Sanyo Chemical Co. was predried in the above dryers at 77° C. for 24 hours. It was then melt mixed in the above compounder with undried HUNTSMAN P4G2Z-

159 polypropylene homopolymer in a 70/30 ratio at about 240° C., then forced through a strand die into 20° C. water and pelletized. The compounded tie-layer pellets were then dried again at 77° C. for 24 hours in a NOVATECH dryer, and conveyed using desiccated air to the extruder. The tie layer was melted in the extruder such that it exited the extruder at a temperature around 232° C. The DRL and tie layer melt was pumped through a Cloeren feedblock. The melt exiting the die was 299° C. and was extrusion coated on the support. The ratio of DRL to tie layer thickness was 2:1, where DRL thickness was 2 µm.

Example 2

Voided Film Without a Dye Receiver Layer

In this example, a three layer biaxially oriented voided polypropylene film from Mobil (350K18) of caliper 33.02 µm was laminated to one side of raw paper base of caliper 132.08 µm. To balance the curl of the structure a biaxially oriented polypropylene film obtained from Mobil (70MLT) of caliper 17.78 µm was laminated to the other side of raw paper base. The total caliper of the structure was 213.36 µm. Samples of this structure were printed in a thermal printer at a line time of 5 millisec. During the printing process, the donor was in contact with the top layer of the three layer voided film Example 3

(Inventive) Oriented Foamed Polylactic Acid (PLA) Sheet from an Amorphous Made of Polylactic Acid (PLA)

Example 3 was an oriented foamed polylactic acid (PLA) sheet, with a basis weight of 229.58 gm/m$^2$ and an average sheet caliper of 226.06 µm, in which there was a near instantaneous control of the polymer's surface diffusion rate of the image layer side of the cast polymer sheet, followed by bulk heat transfer on the balance of the sheet. This instantaneous control was accomplished by controlling the dimensionless time (t*) spent by the extrudate prior to its coming into contact with the high heat transfer surface. This dimensionless time t*, which has no physical units, may be defined as the ratio of the product of diffisivity of the gas (D, has units of m$^2$/sec) and the process time t (units are seconds), to the square of half the extrudate thickness ((l/2)^2, units are m$^2$) or it can be represented as t*=Dt/(l/2)^2. This, t* is preferably less than 0.07, more preferably less than 0.05, and most preferably less than 0.04. For this Example, the t* was approximately 0.019. The foam core sheet was made with 97.5 weight % of polylactic acid (PLA8300D) from NatureWorks LLC, with a density of 1.23 gm/cc. PLA8300D has a melt viscosity (measured using a rheometer in nitrogen environment) of about 1,897.8 Pa-sec at a shear rate of 1 sec$^{-1}$ and temperature of 200° C. An endothermic chemical blowing agent concentrate CT1636, a mixture of sodium bicarbonate and citric acid and its esters, was obtained from Clariant Corporation. The CT1636 concentrate has 20% active blowing agent and is a diluted version of RBN40 from Clariant Corporation. The CT1636 concentrate was added to the above polymer blend ratio at approximately 2.5 weight % or 0.5 weight percent of active blowing agent. The blend was extruded on a 0.063 m single screw extruder. A coat hanger die was used. The resin was extruded through a melt pipe where melt temperature in the center of the pipe was measured to be 218.9° C. The melt was fed to a coat hanger die maintained at 169.4° C. onto a cooling configuration which consisted of a small high heat transfer surface maintained at 21.1° C. and a larger (0.686 m) diameter heat transfer roller that was run at a temperature of approximately 48.9° C. The cast polymer sheet was stripped from the large roller surface and then stretched (stretch ratio is 4×) in the machine direction by a series of heated sequentially driven rollers which formed a machine direction orienter. Stretching served to accentuate the roughness of surfaces by enlarging or at least elongating the surface features. There were 14 heated rolls all together whose temperatures and speeds could be varied. Samples were taken at the end of the machine direction orienter and printed in a thermal printer at a line time of 5 millisec. The density of the oriented foamed polylactic acid (PLA) sheet was 1.015 gm/cc.

Example 4

(Inventive) Oriented Foamed Polylactic Acid (PLA) Sheet from an Semi-Crystalline Grade of Polylactic Acid (PLA)

Example 4 was a foamed polylactic acid (PLA) sheet with a basis weight of 221.89 gm/m$^2$ and an average sheet caliper of 239.09 µm, in which there was a near instantaneous control of the polymer's surface diffusion rate of the image layer side of the cast polymer sheet, and then followed by bulk heat transfer on the balance of the sheet. This instantaneous control was accomplished by controlling the dimensionless time (t*) spent by the extrudate prior to its coming into contact with the high heat transfer surface. For this Example, the t* was approximately 0.021. The foam core sheet was made with a 97.5 weight %, of polylactic acid from NatureWorks LLC (PLA2002D) with a melt viscosity (measured using a rheometer in nitrogen environment) of about 1,519.8 Pa-sec at a shear rate of 1 sec$^{-1}$ and temperature of 200° C. An endothermic chemical blowing agent concentrate CT1636, which has 20% active blowing agent and is a diluted version of RBN40, was obtained from Clariant Corporation, and was added to the above polymer blend ratio at approximately 3 weight % or 0.6 weight percent of active blowing agent. The blend was extruded on a 0.063 m single screw extruder. The resin was extruded through a melt pipe where melt temperature in the center of the pipe was measured to be 217.8° C. The melt was fed to a coat hanger die maintained at 169.4° C. onto a cooling configuration which consisted of a small high heat transfer surface maintained at 21.1° C. and a larger (0.686 m) diameter heat transfer roller that was run at a temperature of approximately 48.9° C. The cast polymer sheet was stripped from the large roller surface and then stretched (stretch ratio is 4×) in the machine direction by a series of heated sequentially driven rollers which formed a machine direction orienter. Stretching served to accentuate the roughness of surfaces by enlarging or at least elongating the surface features. Samples were taken at the end of the machine direction orienter and printed in a thermal printer at a line time of 5 millisec. The density of oriented foamed polylactic acid (PLA) sheet was 0.928 gm/cc. Note that there is an expected stiffness difference between amorphous and semi-crystalline polylactic acid.

Example 5

(Inventive): Amorphous Polylactic Acid (PLA) with 4.5% of Plasticizer)

Example 5 was a foamed, oriented polylactic acid (PLA) sheet with a basis weight of 285.83 gm/m$^2$ and an average sheet caliper of 257.81 μm in which there was a near instantaneous control of the polymer's surface diffusion rate of the image layer side of the cast polymer sheet and then followed by bulk heat transfer on the balance of the sheet. This instantaneous control was accomplished by controlling the dimensionless time (t*) spent by the extrudate prior to its coming into contact with the high heat transfer surface. For this Example, the t* was approximately 0.044. The foam core sheet was made with a 92.5 weight %, of polylactic acid (PLA8300D) from NatureWorks corporation, with a melt viscosity of about 1,897.8 Pa-sec at a shear rate of 1 $sec^{-1}$ and temperature of 200° C., and 4.5 weight % dioctyl sebacate (DOS), a plasticizer. In order to incorporate DOS, a 5 weight % DOS concentrate was made in a Leistritz twin screw extruder where DOS was injected as a liquid into the polylactic acid (PLA) melt. The plasticizer reduces the glass transition temperature of polylactic acid (PLA). An endothermic chemical blowing agent concentrate CT 1636, which has 20% active blowing agent and is a diluted version of RBN40, was obtained from Clariant Corporation, and was added to the above polymer blend ratio at approximately 2.5 weight % or 0.5 weight percent of blowing agent. The blend was extruded on a 0.063 m single screw extruder. The resin was extruded through a melt pipe where in the center of the pipe melt temperature was measured to be 196.7° C. The melt was fed to a coat hanger die maintained around 165.6° C. onto a cooling configuration which consisted of a small high heat transfer surface maintained at 21.1° C. and a larger (0.686 m) diameter heat transfer roller that was run at a temperature of approximately 40.6° C. The cast polymer sheet was stripped from the large roller surface and then stretched (stretch ratio is 4×) in the machine direction by a series of heated sequentially driven rollers, which formed a machine direction orienter. There were 14 heated rolls all together whose temperatures and speeds could be varied. Samples were taken at the end of the machine direction orienter and printed in a thermal printer at a line time of 5 millisec. The density of the oriented and foamed polylactic acid (PLA) sheet was 1.1 gm/cc.

Example 6

Inventive: Polylactic Acid (PLA) with Branched, Aliphatic Polyester H16

Example 6 was a foamed oriented polylactic acid (PLA) sheet with a basis weight of 292.63 gm/m² and an average sheet caliper of 262.13 μm in which there was a near instantaneous control of the polymer's surface diffusion rate of the image layer side of the cast polymer sheet and then followed by bulk heat transfer on the balance of the sheet. This instantaneous control was accomplished by controlling the dimensionless time (t*) spent by the extrudate prior to its coming into contact with the high heat transfer surface. For this Example, the t* was approximately 0.039. The foam core sheet was made with a 90.0 weight %, of polylactic acid from NatureWorks corporation (PLA8300D) with a melt viscosity (measured in a rheometer under nitrogen environment) of about 1,897.8 Pa-sec at a shear rate of 1 $sec^{-1}$ and temperature of 200° C., and 7.5 weight % branched aliphatic polyester (made using 2% branching agent and having a molecular weight of 124,000) to increase melt strength, and thereby increase the foam. An endothermic chemical blowing agent concentrate CT1636, which has 20% active blowing agent and is a diluted version of RBN40, was obtained from Clariant Corporation, and was added to the above polymer blend ratio at approximately 2.5 weight % or 0.5 weight percent of active blowing agent. The blend was extruded on a 0.063 m single screw extruder. The resin was extruded through a melt pipe where in the center of the pipe melt temperature was measured to be 198.9° C. The melt was fed to a coat hanger die maintained around 168.3° C. onto a cooling configuration which consisted of a small high heat transfer surface maintained at 15.6° C. and a larger (0.686 m) diameter heat transfer roller that was run at a temperature of approximately 48.9° C. The cast polymer sheet was stripped from the large roller surface and then stretched (stretch ratio is 4×) in the machine direction by a series of heated sequentially driven rollers which formed a machine direction orienter. Samples were taken at the end of the machine direction orienter and printed in a thermal printer at a line time of 5 millisec. The density of the oriented and foamed polylactic acid (PLA) sheet was 1.12 gm/cc.

Example 7

Inventive: Higher Blowing Agent and Branched, Aliphatic Polyester H16

Example 7 was a foamed polylactic acid (PLA) sheet with a basis weight of 252.26 gm/m² and an average sheet caliper of 267.46 μm in which there was a near instantaneous control of the polymer's surface diffusion rate of the image layer side of the cast polymer sheet and then followed by bulk heat transfer on the balance of the sheet. This instantaneous control was accomplished by controlling the dimensionless time (t*) spent by the extrudate prior to its coming into contact with the high heat transfer surface. For this Example, the t* was approximately 0.04. The foam core sheet was made with a 89.6 weight %, of polylactic acid from NatureWorks corporation (PLA8300D) with a melt viscosity (measured in a rheometer under nitrogen environment) of about 1,897.8 Pa-sec at a shear rate of 1 $sec^{-1}$ and temperature of 200° C., and 9.75 weight % of a branched polyester (made using 2% branching agent and having a molecular weight of 124,000). An endothermic chemical blowing agent concentrate CT1636, which has 20% active blowing agent and is a diluted version of RBN40, was obtained from Clariant Corporation, and was added to the above polymer blend ratio at approximately 3.5 weight % or 0.65 weight percent of active blowing agent. This increased amount of blowing agent from Example 5 was intended to produce a decrease in foam density. The blend was extruded on a 0.063 m single screw extruder. The resin was extruded through a melt pipe where in the center of the pipe melt temperature was measured to be 200° C. The melt was fed to a coat hanger die maintained around 166.9° C. onto a cooling configuration which consisted of a small high heat transfer surface maintained at 21.1° C. and a larger (0.686 m) diameter heat transfer roller that was run at a temperature of approximately 48.9 ° C. The cast polymer sheet was stripped from the large roller surface and then stretched (stretch ratio is 4×) in the machine direction by a series of heated sequentially driven rollers which formed a machine direction orienter. Samples were taken at the end of the machine direction orienter and printed in a thermal printer at a line time of 5 millisec. The density of the oriented and foamed polylactic acid (PLA) sheet was 0.942 gm/cc.

Example 8

Comparative PET Foam

Example 8 was a foamed oriented polyethylene terephtalate (PET) sheet with a basis weight of 258.9 gm/m² and an average sheet caliper of 352.3 µm in which there was a near instantaneous control of the polymer's surface diffusion rate of the image layer side of the cast polymer sheet and then followed by bulk heat transfer on the balance of the sheet. The foam core sheet was made with a 96.5 weight %, of polyethylene terepthalate from Eastman chemical corporation (PET7352) with an intrinsic viscosity of 0.7. An endothermic chemical blowing agent concentrate CT1636, which has 20% active blowing agent and is a diluted version of RBN40, was obtained from Clariant Corporation, and was added to the above polymer blend ratio at approximately 3.5 weight % or 0.65 weight percent of blowing agent. The blend was extruded on a 0.063 m single screw extruder. The resin was extruded through a melt pipe where in the center of the pipe melt temperature was measured to be 276.7° C. The melt was fed to a coat hanger die maintained around 256.7° C. onto a cooling configuration which consisted of a small high heat transfer surface maintained at 26.7° C. and a larger (0.686 m) diameter heat transfer roller that was run at a temperature of approximately 54.4° C. The cast polymer sheet was stripped from the large roller surface and then stretched (stretch ratio is 3.5×) in the machine direction by a series of heated sequentially driven rollers which formed a machine direction orienter. Samples were taken at the end of the machine direction orienter and printed in a thermal printer at a line time of 5 millisec. The density of oriented foamed PET sheet was 0.735 µm/cc.

Example 9

Comparative PET Foam with Branched Polymer

Example 9 was a foamed oriented polyethylene terephtalate (PET) sheet with a basis weight of 248.37 gm/m² and an average sheet caliper of 255.27 µm in which there was a near instantaneous control of the polymer's surface diffusion rate of the image layer side of the cast polymer sheet and then followed by bulk heat transfer on the balance of the sheet. The foam core sheet was made with a 90 weight %, of polyethylene terepthalate from Eastman chemical corporation (PET7352) with an intrinsic viscosity of and 7.5 weight % of a branched polyester (made using 2% branching agent and has a molecular weight of 124,000). An endothermic chemical blowing agent concentrate CT1636, which has 20% active blowing agent and is a diluted version of RBN40, was obtained from Clariant Corporation, and was added to the above polymer blend ratio at approximately 3.5 weight % or 0.65 weight percent of active blowing agent. The blend was extruded on a 0.063 m single screw extruder. The resin was extruded through a melt pipe where in the center of the pipe melt temperature was measured to be 275.6° C. The melt was fed to a coat hanger die maintained around 256.7° C. onto a cooling configuration which consisted of a small high heat transfer surface maintained at 26.7° C. and a larger (0.686 m) diameter heat transfer roller that was run at a temperature of approximately 54.4° C. The cast polymer sheet was stripped from the large roller surface and then stretched (stretch ratio is 3.5×) in the machine direction by a series of heated sequentially driven rollers which formed a machine direction orienter. Samples were taken at the end of the machine direction orienter and printed in a thermal printer at a line time of 5 millisec. The density of oriented foamed PET sheet was 0.972 gm/cc.

Example 10

Comparative Polypropylene Foam as Made Using U.S. Pat. Appl. 20050181196

Example 10 was a conventional oriented support, a foamed polypropylene (PP) sheet with a basis weight of 91.86 gm/m² and an average sheet caliper of 189.23 µm in which there was a near instantaneous control of the polymer's surface diffusion rate of the image layer side of the cast polymer sheet and then followed by bulk heat transfer on the balance of the sheet. The foam core sheet was made with 80 weight %, of P4-011 grade of polypropylene from Huntsman chemical corporation which has a melt flow rate of 12 gm. polymer extruded/10 min, 10 weight % of P4G2Z-159 grade of polypropylene from Huntsman chemical corporation which has a melt flow rate of 1.9 gm. polymer extruded/10 min and 7.5 weight % of a high melt strength polypropylene (Dow D114.01) with a melt flow rate of 0.42 gm. polymer extruded/10 min. The melt flow rates are characterized according to ASTM D1238. An endothermic chemical blowing agent concentrate CT1636, which has 20% active blowing agent and is a diluted version of RBN40, was obtained from Clariant Corporation, and was added to the above polymer blend ratio at approximately 2.5 weight % or 0.5 weight percent of active blowing agent. The blend was extruded on a 0.063 m single screw extruder. A coat hanger die was used. The resin was extruded at a melt temperature of 221.67° C. onto a cooling configuration which consisted of a small high heat transfer surface maintained at 21.1° C. and a larger (0.686 m) diameter heat transfer roller that was run at a temperature of approximately 71.1° C. The cast polymer sheet was stripped from the large roller surface and then stretched (stretch ratio is 6×) in the machine direction by a series of heated sequentially driven rollers which formed a machine direction orienter. The polypropylene foam was 189.23 m thick and had a density of 0.485 gm/cc. This low density improves print density and increases opacity of the layer. Samples were taken at the end of the machine direction orienter. The samples were laminated to a biaxially oriented polypropylene support and the polypropylene foam printed in a thermal printer at a line time of 5 millisec.

Example 11

Comparative Oriented Unfoamed Polylactic Acid (PLA) Sheet from a Semi-Crystalline Grade of Polylactic Acid (PLA)

Example 11 was a unfoamed, oriented polylactic acid (PLA) sheet with a basis weight of 364.03 gm/m² and an average sheet caliper of 290.4 µm in which there was near instantaneous control of the polymer's surface diffusion rate of the image layer side of the cast polymer sheet and the followed by bulk heat transfer on the balance of the sheet. The unfoamed core sheet was made with 100% of polylactic acid from NatureWorks LLC (PLA2002D) which has a melt viscosity (measured in a rheometer under nitrogen environment) of about 1,519.8 Pa-sec at a shear rate of 1 sec$^{-1}$ and temperature of 200° C. The blend was extruded on a 0.063 m single screw extruder. The resin was extruded through a melt pipe where in the center of the pipe melt temperature was measured to be 233.9° C. The melt was fed to a coat hanger die maintained around 204.4° C. onto a cooling configuration which consisted of a small high heat transfer surface maintained at 21.1° C. and a larger (0.686 m) diameter heat transfer roller that was run at a temperature of approximately 48.9° C. The cast polymer sheet was stripped from the large roller surface and then stretched (stretch ratio is 3.5×) in the machine direction by a series of heated sequentially driven rollers which formed a machine direction orienter. Stretching serves to accentuate the roughness of surfaces by enlarging, or at least elongating, the surface features. Samples were taken at the end of the machine direction orienter and printed in a thermal printer at a line time of 5 millisec. There was no (zero) density reduction of the oriented unfoamed polylactic acid sheet. The non-cross-linked polyester layer can also function as a dye receiving layer when unvoided, as can be seen by comparing examples 2 and 11. However, the receiving layer is transparent and not as effective as the inventive samples with respect to dye density.

Example 12

Comparative Oriented Unfoamed Polylactic Acid (PLA) Sheet from a Amorphous Grade of Polylactic Acid (PLA)

Example 12 was a unfoamed, oriented polylactic acid (PLA) sheet with a basis weight of 364.03 gm/m² and an average sheet caliper of 290.4 μm in which there was near instantaneous control of the polymer's surface diffusion rate of the image layer side of the cast polymer sheet and the followed by bulk heat transfer on the balance of the sheet. The unfoamed core sheet was made with 100% of polylactic acid from NatureWorks LLC (PLA8300D) which has a melt viscosity (measured in a rheometer under nitrogen environment) of 1897.8 Pa-sec at a shear rate of 1 sec$^{-1}$ and temperature of 200° C. The blend was extruded on a 0.063 m single screw extruder. The resin was extruded through a melt pipe where in the center of the pipe melt temperature was measured to be 233.9° C. The melt was fed to a coat hanger die maintained around 204.4° C. onto a cooling configuration which consisted of a small high heat transfer surface maintained at 21.1° C. and a larger (0.686 m) diameter heat transfer roller that was run at a temperature of approximately 48.9° C. The cast polymer sheet was stripped from the large roller surface and then stretched (stretch ratio is 4×) in the machine direction by a series of heated sequentially driven rollers which formed a machine direction orienter. Stretching serves to accentuate the roughness of surfaces by enlarging, or at least elongating, the surface features. Samples were taken at the end of the machine direction orienter and printed in a thermal printer at a line time of 5 millisec. There was no (zero) density reduction of the oriented unfoamed polylactic acid sheet. The non-cross-linked polyester layer can also function as a dye receiving layer when unvoided, as can be seen by comparing examples 2 and 11. However, the receiving layer is transparent and not as effective as the inventive samples with respect to dye density.

Example 13

(Inventive) Oriented Foamed Polylactic Acid (PLA) Sheet from an Amorphous Grade of Polylactic Acid (PLA)

Example 13 is the oriented foam PLA sample created in Example 3 and extrusion coated with a dye receiver layer and tie layer used in Example 1. The resulting samples were printed in a thermal printer at a line time of 5 millisec.

TABLE 1

| Example # | Description | $T_g$ of the receiver layer | Dmax (11th step) |
|---|---|---|---|
| 1 (control/support + DRL) | Receiver paper base with a voided BOPP laminate on the image side and an anticurl BOPP laminate on wire side. A thermal dye receiver layer has been coated on voided laminate | 45° C. | 2.81 |
| 2 (control/support only) | Receiver paper base with a voided BOPP laminate on the image side and an anticurl BOPP laminate on wire side. No DRL | Approx. 0° C. | 1.04 |
| 3 (inventive) | Foamed PLA8300D sheet | 56.05° C. | 2.14 |
| 4 (inventive) | Foamed PLA2002D sheet | 59.15° C. | 2.06 |
| 5 (inventive) | Foamed PLA8300D with 4.5% DOS (plasticizer) | 47.85° C. | 2.17 |
| 6 (inventive) | Foamed PLA8300D with H16 (branched polyester) | — | 2.09 |
| 7 (inventive) | Foamed PLA with higher H16 (branched polyester) and higher B.A. | 56.6° C. | 2.29 |
| 8 (control) | Foamed PET7352 | 77.5° C. | — |
| 9 (control) | Foamed PET7352 with H16 | 76.95° C. | 1.02 |
| 10 (control) | Foamed PP on support | Approx. 0° C. | 0.75 |
| 11 (control) | Unfoamed PLA2002D sheet | 56.65° C. | 1.61 |
| 12 (control) | Unfoamed PLA8300D sheet | 56.9° C. | 1.69 |

Table 1 illustrates that conventional support, without a specialized image receiving layer, is a poor image receiver. However, the present inventive support can function as an image receiver, especially when the $T_g$ of the polymer, here, polylactic acid, is between 47 and 60° C.

TABLE 2

| Example# | Smoothness of Image-receiving Side/Layer (μm) | Basis wt. (gm/m²) | Caliper (μm) | Density (gm/cc) (density reduction %) | Norm. opacity | Stiffness MD (mN) | Stiffness CD (mN) |
|---|---|---|---|---|---|---|---|
| 1(control) | | | 215.08 | N.A. | 0.447 | 188 | 184 |
| 2(control) | | | 212.08 | N.A. | 0.454 | 188 | 184 |
| 3(inventive) | 0.72 | 229.58 | 226.06 | 1.015 (17.5%) | 0.34 | 268.83 | 141.5 |
| 4(inventive) | 0.43 | 221.89 | 239.09 | 0.928 (24.6%) | 0.323 | 285.5 | 128 |

TABLE 2-continued

| Example# | Smoothness of Image-receiving Side/Layer (μm) | Basis wt. (gm/m²) | Caliper (μm) | Density (gm/cc) (density reduction %) | Norm. opacity | Stiffness MD (mN) | Stiffness CD (mN) |
|---|---|---|---|---|---|---|---|
| 5(inventive) | 0.34 | 285.83 | 257.81 | 1.108 (9.9%) | 0.22 | 402.5 | 193.5 |
| 6(inventive) | 0.46 | 292.63 | 262.18 | 1.12 (8.9%) | 0.227 | 395.2 | 244.4 |
| 7(inventive) | 0.7 | 252.26 | 267.42 | 0.942 (23.4%) | 0.289 | 315.6 | 159.9 |
| 8(control) | 0.69 | 258.9 | 352.3 | 0.735 (approx. 43.5%) | 0.181 | 551 | 157 |
| 9(control) | 0.53 | 248.37 | 255.27 | 0.972 (approx. 25.2%) | 0.254 | 357 | 91.5 |
| 10(control) | 2.27 | 123.02 | 204.22 | 0.602 (approx. 33%) | 0.336 | Not measured | Not measured |
| 11(control) |  | 295.18 | 200 | 0% | 0.103 | 235.7 | 151.7 |
| 12(control) | 0.172 | 364.03 | 290.42 | 0% | 0.037 | 574.2 | 405 |

Table 2 illustrates the various physical parameters of the exemplified materials.

TABLE 3

| Example # | Description | Dmax (11th step) | Dmax-3 (8th step) | Dmax-5 (6th step) |
|---|---|---|---|---|
| 1 (control) | Receiver paper base with a voided BOPP laminate on the image side and an anticurl BOPP laminate on wire side. A thermal dye receiver layer has been coated on voided laminate | 2.81 | 1.71 | 0.89 |
| 2 (control) | Receiver paper base with a voided BOPP laminate on the image side and an anticurl BOPP laminate on wire side. | 1.04 | 0.35 | 0.08 |
| 3 (inventive) | Foamed PLA8300D sheet | 2.14 | 1.06 | .33 |
| 4 (inventive) | Foamed PLA2002D sheet | 2.06 | 1.01 | 0.3 |
| 5 (inventive) | Foamed PLA8300D with 4.5% DOS | 2.17 | 1.02 | 0.27 |
| 6 (inventive) | Foamed PLA8300D with H16 | 2.09 | 1.09 | 0.26 |
| 7 (inventive) | Foamed PLA with higherH16 and higher B.A. | 2.29 | 1.18 | 0.37 |
| 9 (control) | Foamed PET7352 with H16 (data is for foamed PET) | 1.02 | 0.34 | 0.13 |
| 10 (control) | Polypropylene foam on a support | 0.75 | 0.37 | 0.15 |
| 11 (control) | Unfoamed PLA2002D sheet | 1.61 | 0.53 | 0.11 |
| 12 (control) | Unfoamed PLA8300D sheet | 1.69 | 0.54 | 0.11 |
| 13 (inventive) | Foamed PLA8300D sheet (sample 3) with a coated thermal dye receiver layer | 2.65 | 1.49 | 0.52 |

Table 3 illustrates the functionality of the inventive examples as image receivers or receiving layers, as compared to the control materials. When the dye density values of Table 3 are combined with the physical property values of Table 2, additional variables can be determined to further improve the function of the inventive support as both a support and an image receiver. Table 3 also highlights the impact of coating a foamed PLA sample with an extra dye receiver layer, which results in Sample 13. It is observed from Table 3 that this results in increased dye transfer efficiency and shows up as higher print densities. Similar extensions of the invention can be made to achieve the same functionality of an imaging element, where the foamed non-crosslinked aliphatic polyester is coated with an aqueous sub and an extruded thermal dye receiver layer or an aqueous sub and an aqueous dye receiver layer.

Table 4 illustrates moisture uptake of the imaging elements of this invention. It is observed that the moisture uptake of the foamed PLA samples is similar to the unfoamed PLA samples at 50% RH and 80% RH at 21.3° C. (close to ambient temperature). The uptake of moisture by the foamed or low density imaging element (Example 3) is less than 3% by weight and is of same order of magnitude as that absorbed by the aliphatic polyester resin (Example 12). It is important that imaging elements have a moisture uptake less than 3% by weight at 80% RH and 21.3° C., because dye transfer efficiency and printing can be affected As discussed above, moisture permeability is defined in terms of moisture pickup or uptake at 80% RH and 21.3° C. For calculation purposes the sample weight at 20% RH and 21.3° C. is the reference sample weight used.

TABLE 4

| Example | Description | % Moisture Pickup @ 50% RH, and 21.3° C. | % Moisture Pickup @ 80% RH, and 21.3° C. |
| --- | --- | --- | --- |
| Example 3 (Invention) | Foamed PLA8300D sheet | 0.271 | 0.618 |
| Example 11 (Comparison) | Unfoamed PLA2002D sheet | 0.243 | 0.487 |
| Example 12 (Comparison) | Unfoamed PLA8300D sheet | 0.238 | 0.479 |

The invention has been described in detail with particular reference to certain preferred embodiments thereof, but it will be understood that variations and modifications can be effected within the spirit and scope of the invention.

The invention claimed is:

1. An image receiver element comprising a single low density layer, wherein said single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C.

2. The receiver element of claim 1 wherein said non-crosslinked aliphatic polyester has a $T_g$ of 47 to 60° C.

3. The receiver element of claim 1 wherein said non-crosslinked aliphatic polyester is a polyhydroxyalkanoate.

4. The receiver element of claim 3 wherein said non-crosslinked aliphatic polyester is polylactic acid.

5. The receiver element of claim 1 further comprising a branched aliphatic polyester.

6. The receiver element of claim 1 wherein the said single low density layer includes up to 10 wt. % plasticizer.

7. The receiver element of claim 1 wherein said single low density layer is a foamed layer.

8. The receiver element of claim 1 wherein said single low density layer is a voided layer.

9. The receiver element of claim 1 wherein said single low density layer comprises non-crosslinked aliphatic polyester and hollow particles.

10. The receiver element of claim 1 wherein said low density layer is an oriented low density layer.

11. The receiver element of claim 10 wherein the oriented low density layer has a machine direction (MD) and a cross direction (CD), and the ratio (MD:CD) of modulus 2.5:1 to 1:2.5 and the normalized opacity of said oriented low density layer is from 0.25 to 1.

12. The receiver element of claim 1 wherein said image receiver is a thermal dye receiver capable of receiving dye transfer by heat and diffusion.

13. The receiver element of claim 1 wherein said image receiver is an electrophotographic receiver.

14. The receiver element of claim 1 wherein said layer has a first side and a second side, and both said first side and said second side are capable of receiving an image.

15. The receiver element of claim 1 wherein said image receiver is extruded.

16. The receiver element of claim 1 wherein said image receiver is a packaging material.

17. A method of forming an image receiver element comprising:
obtaining a polyester resin;
modifying the polyester resin to produce a non-crosslinked aliphatic polyester resin having a Tg of 40-70° C.; and
forming a single low density layer by reducing the density of said modified non-crosslinked aliphatic polyester resin to form an image receiver element comprising a single layer, wherein said single low density layer comprises non-crosslinked aliphatic polyester resin having a Tg of 40-70° C. containing non-interconnected void space, and wherein the single low density layer does not absorb more than 3 weight % moisture at 80% RH and 21.3° C. as compared to the weight % moisture of said single low density layer at 20% RH and 21.3° C.

18. The method of claim 16 wherein said reducing the density of said modified non-crosslinked aliphatic polyester resin comprises foaming.

19. The method of claim 16 wherein said reducing the density of said modified polyester resin comprises voiding.

20. The method of claim 16 wherein said reducing the density of said modified polyester resin comprises the inclusion of hollow particles.

21. A printing system comprising an imaging material and an image receiver element, wherein the imaging material comprises a colorant capable of transfer to said image receiver element, and wherein said image receiver element is capable of receiving dye transfer by heat and diffusion and comprises a single low density layer, wherein said single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C.

22. The printing system of claim 21, wherein the printing system is a thermal printer system or an electrophotographic system.

23. A method of printing, comprising:
obtaining an imaging material comprising a colorant layer;
obtaining an image receiver element comprising a single low density layer, wherein said single low density layer comprises non-crosslinked aliphatic polyester containing non-interconnected void space, and wherein the single low density layer does not absorb more than 3 weight % moisture at 80% RH and 21.3° C. as compared to the weight % moisture of said single low density layer at 20% RH and 21.3° C.;
superposing said colorant layer with said receiver element; and
transferring colorant from said imaging material to said image receiver element.

24. The method of claim 23 wherein said transferring colorant comprises applying heat to the imaging material.

25. The method of claim 23 further comprising superposing a second imaging material comprising a second colorant layer with a second side of said image receiver, and transferring a second colorant from said second imaging material to said second side of said image receiver.

* * * * *